Feb. 2, 1965  R. B. GOODY ETAL  3,168,698
ELECTRICAL CLAMP-ON METER WITH SWIVEL CONNECTED TONGS
Filed June 27, 1960  3 Sheets-Sheet 3
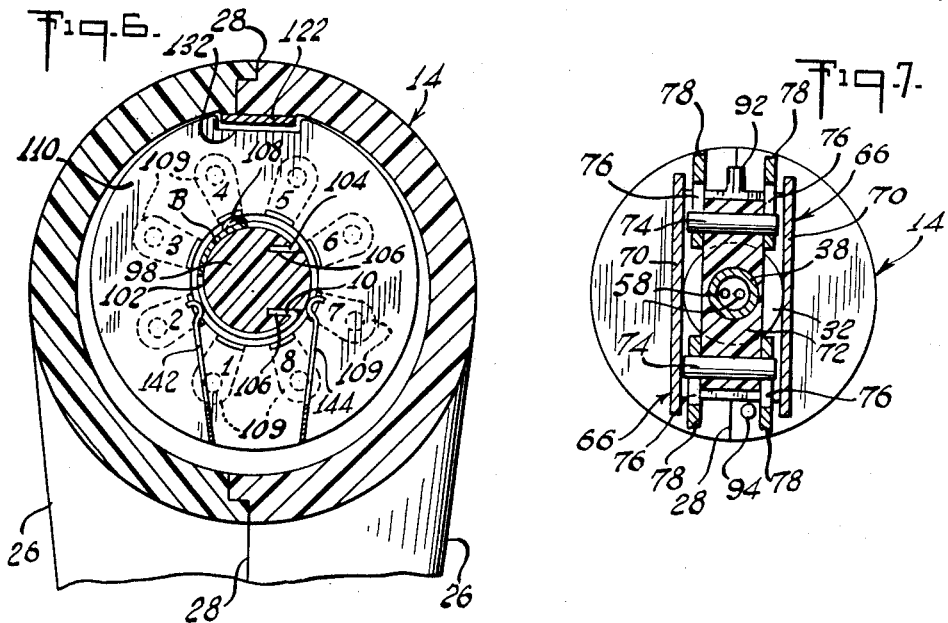
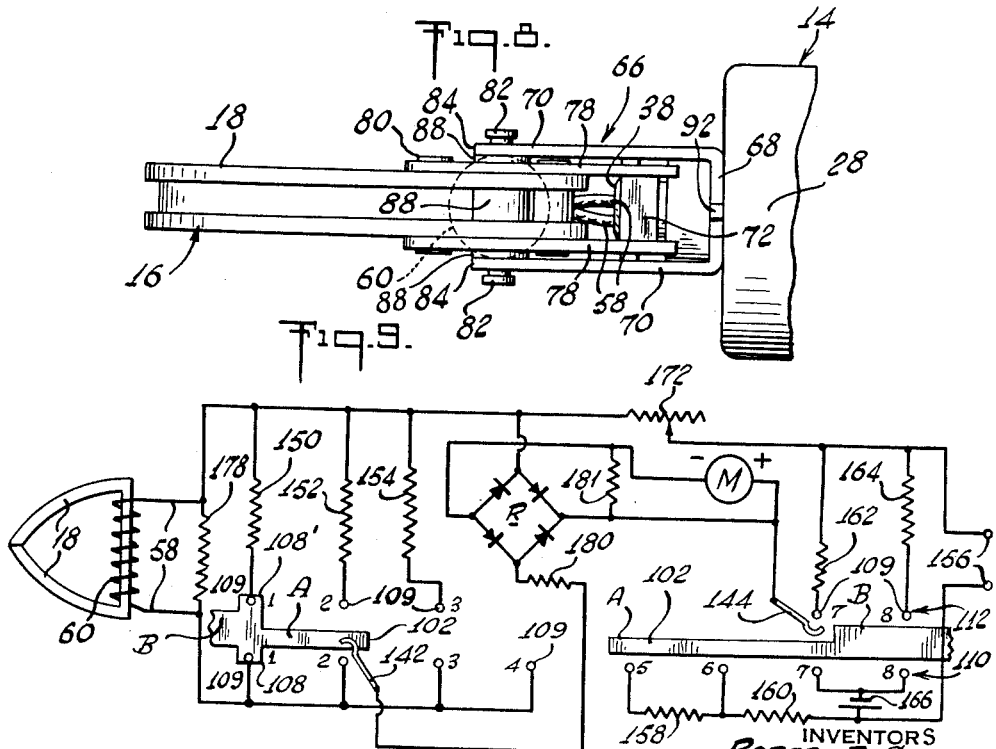
INVENTORS
ROBERT B. GOODY
DAVID H. DABNEY
BY
Paul S. Martin
ATTORNEY

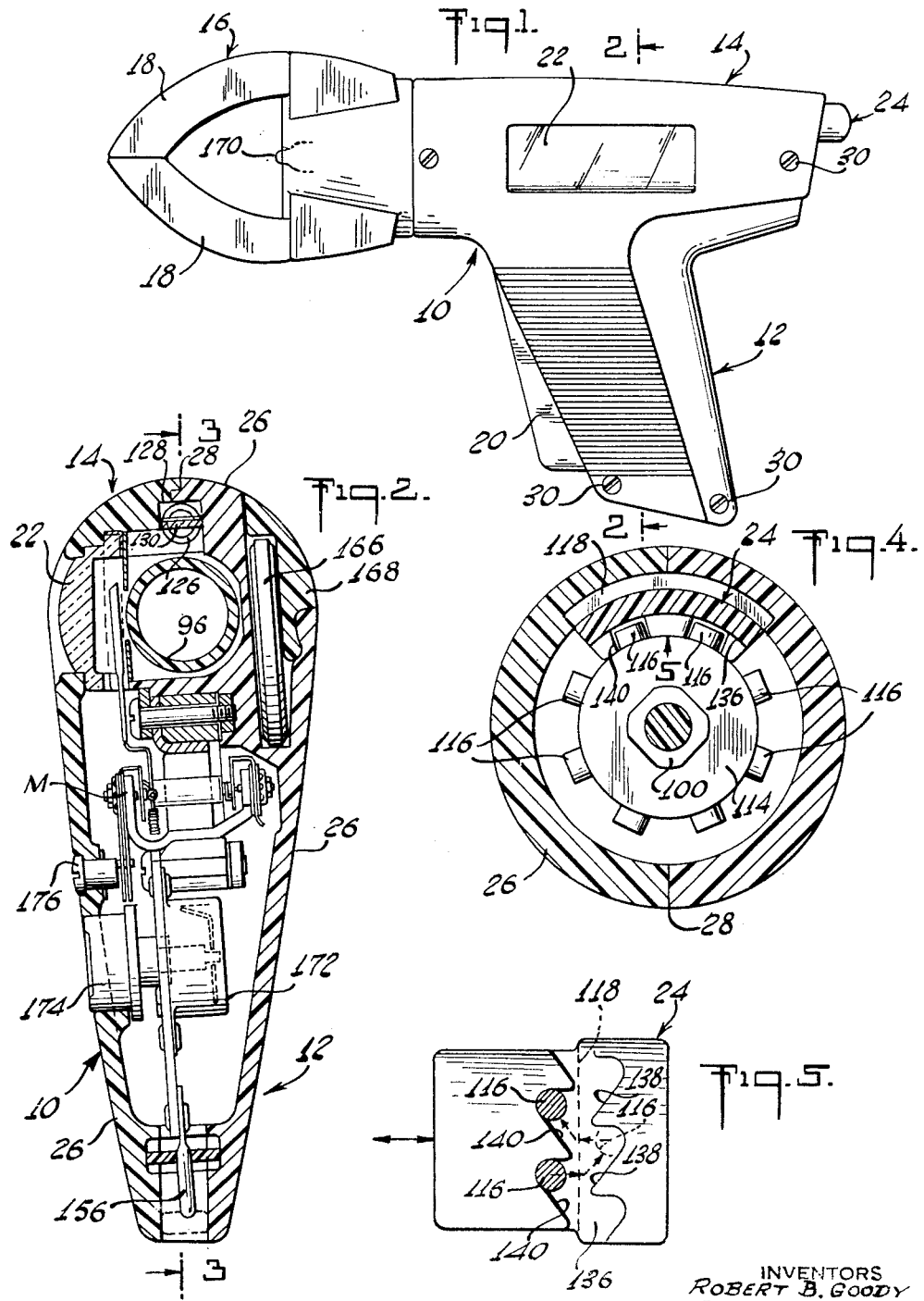

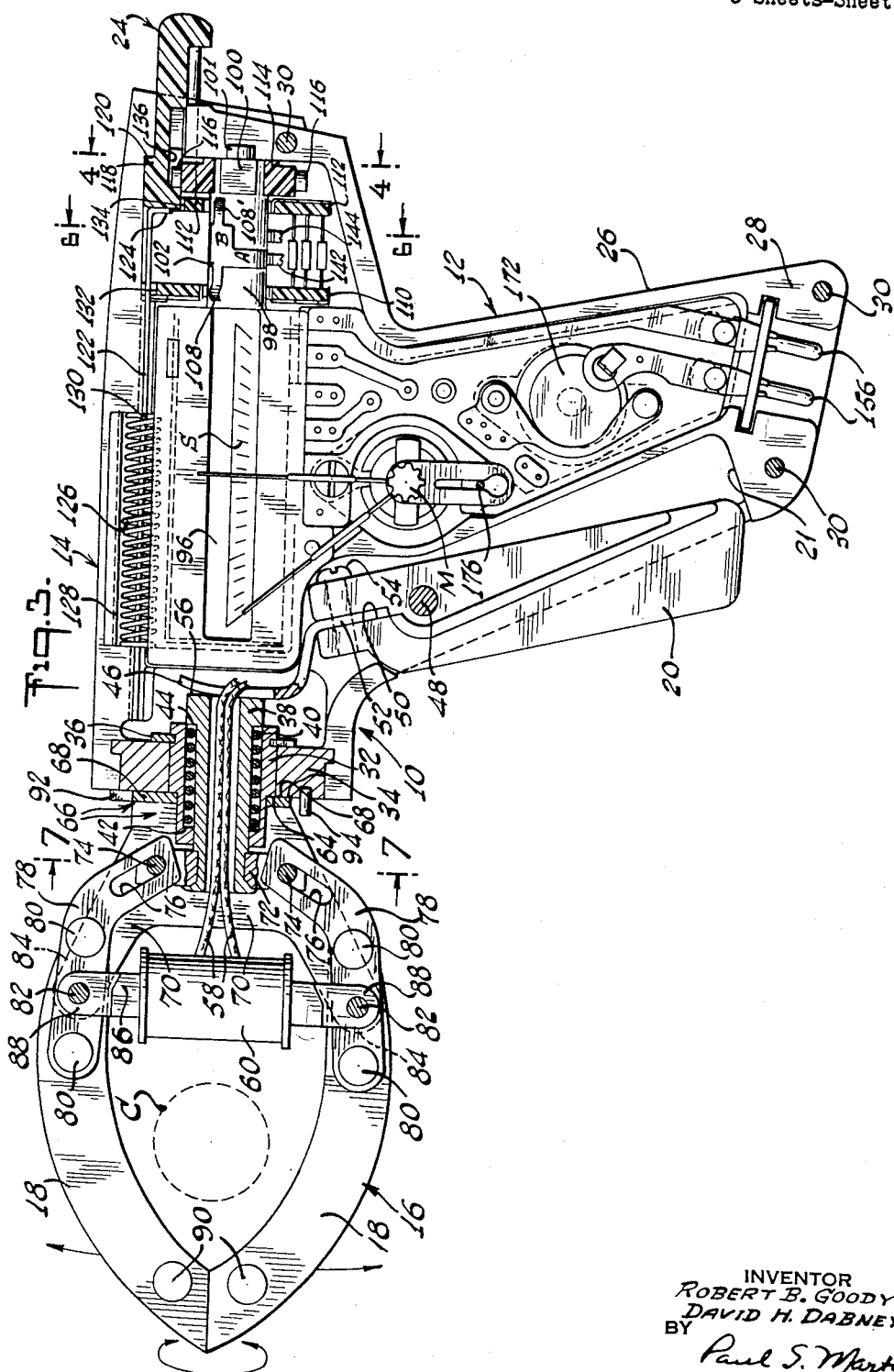

United States Patent Office 3,168,698
Patented Feb. 2, 1965

3,168,698
ELECTRICAL CLAMP-ON METER WITH SWIVEL CONNECTED TONGS
Robert B. Goody, Tenafly, N.J., and David H. Dabney, Peekskill, N.Y., assignors to Federal Pacific Electric Company, a corporation of Delaware
Filed June 27, 1960, Ser. No. 39,161
4 Claims. (Cl. 324—127)

This invention relates generally to an electrical measuring instrument and, more particularly, to a tong-type meter.

Tong-type meters measure current flow in a conductor without breaking the circuit by encircling the conductor and reading the current direct on a meter. The tongs are generally manually openable and self-closing for encircling the conductor and except for this movement are fixed with respect to the instrument and a selected scale. More particularly, the tongs and scale are disposed along generally parallel planes and are immovable from this relative disposition. A selected conductor for test measurement may be relatively inaccessible or in a disposition rendering the application of such a meter thereto difficult or the reading of the meter may be difficult and inconvenient on the application of the tongs to the conductor, and an important aim and object of the present invention is the provision of a tong-type meter which obviates the deficiences of the heretofore used tong-type meters and which facilitates both the application of the tongs to a test conductor and the reading of the scale. Pursuant to this object of the present invention, the tong-type meter is provided with a swivel head carrying the tongs which is rotatable about an axis in the plane of the tongs whereby the tongs and scale are relatively movable out of parallel planes to thereby accommodate the tongs to the disposition of the test conductor and the scale to the operator.

Yet another important object and feature of the present invention is the provision of a generally improved tong-type meter of the character aforedescribed having an improved organization and arrangement facilitating its handling and one-hand application to a test conductor, the meter being of the multi-purpose type having provision for measuring current, voltage and resistance with multi-scales for each.

The illustrative embodiment of the invention, which has been outlined above as incorporating certain novel features forming part of the invention, is more fully described in the remainder of this specification, from which further novel features and objects and advantages will become apparent. In the following description reference is made to the accompanying drawings forming part of this disclosure, in which drawings:

FIG. 1 is a side elevational view of a tong-type meter in accordance with the present invention;

FIG. 2 is a sectional view, on an enlarged scale, taken on the line 2—2 of FIG. 1;

FIG. 3 is a sectional view taken on the line 3—3 of FIG. 2;

FIG. 4 is a sectional view illustrating the scale changing and indexing mechanism, said view being taken on the line 4—4 of FIG. 3;

FIG. 5 is a view of the underside of the push button and its associated cam elements for scale changing and indexing, said view looking in the direction of arrow 5 of FIG. 4;

FIG. 6 is a sectional view, on an enlarged scale, taken on the line 6—6 of FIG. 3;

FIG. 7 is a sectional view taken on the line 7—7 of FIG. 3;

FIG. 8 is a top view illustrating the swivel head and a fragmentary portion of an adjacent part of the meter; and FIG. 9 is a circuit diagram of the meter.

Referring to the drawings, and more particularly to FIGS. 1–3 thereof, there is shown a tong-type meter or measuring instrument 10 which is of the multi-purpose type having provision for measuring current, voltage and resistance with plural scales for each. The instrument 10 is generally of pistol-shaped configuration and is constructed and arranged to facilitate one-hand operation, said instrument comprising a pistol grip or handle part 12, a barrel part 14, and a head 16 which swivels about its axis as will be described in detail below. The head 16 includes a pair of tongs 18 which are manually openable on depression of the trigger 20 and self-closing by spring biasing, the tongs being opened for encircling the conductor C as shown in FIG. 3 with the current flow in such conductor being read directly on the scale S registered in position behind the window 22. It will be understood that the current flow in the conductor C is measured without breaking the circuit by encircling the conductor with the openable tongs. Projecting from the rear of the barrel part 14 is a push button 24 which actuates the scale changing and indexing mechanism and is operative to register a selected scale S at the window 22 and complete the meter circuit companion to such scale. The instrument mechanism is housed in a two-part plastic casing 26 separating on parting line 28, and the two casing parts are held together by screws 30. The swivel head and its actuating mechanism will now be described with reference to FIGS. 3, 7 and 8.

The swivel head 16 includes a rotatable sleeve fitting 32 which is mounted in the bearing part 34 fixed in the casing at the front end of the barrel part. The fitting 32 and mechanism carried thereby is retained in position by the retainer ring 36 which is snapped in a companion groove of the fitting. Extending within and through the fitting 32 is an axially movable plunger 38 surrounded by compression spring 40 which is captured between the shoulders 42 and 44 of the fitting 32 and plunger 38, respectively. The spring 40 biases the plunger to the right, viewing FIG. 3, and concomitantly biases the tongs closed, the plunger being axially movable to the left with respect to fitting 32 to open the tongs by yoke 46 carried by the trigger 20. More particularly, the trigger 20 is pivotally mounted in the recess 21 of the casing at pivot 48 and is actuated by squeezing or depressing the same into the handle part, the trigger being slotted at 50 to receive the part 52 of the yoke 46 which is secured in said slot by screw 54. The forked end of the yoke bears against the inner end 56 of the plunger whereby it will be apparent that on trigger actuation the yoke will depress the plunger and compress the spring 40. The conductors 58 of coil 60 extend through the bore 62 of the plunger and through the forked end of yoke 46 into the casing.

Mounted against the peripheral shoulder 64 of the fitting 32 and rotatable therewith is a U-shaped support bracket 66 comprising a base part 68 and laterally spaced legs 70. Disposed between the legs 70 and secured to the end of the plunger 38 for movement therewith is a link member 72 carrying cam pins 74 which are engaged in companion cam slots 76 of links 78. Member 72 carries two cam pins 74 and each of the latter has a pair of links 78 operatively connected therewith. The tongs 18 are of laminated soft steel construction and have a protective cover of insulation, one end of each tong being secured to, and between a pair of links 78 by fasteners 80. The tongs and companion rigidly connected links are pivotally mounted on pivot pins 82 to which is also connected end portions 84 of legs 70. The pins 82 also mount the laminated soft-iron core 86 of the coil 60, the end of the tongs being forked to receive the mounting end portions 88 of core 86 (FIG. 8). The laminations of the tongs are retained in assembled relation at the front end by rivets or fasteners 90. The entire head assembly may swivel about the axis thereof, which is coincident with the axis of the plunger 38, in the bearing 34 and to restrain rotation of more than 180 degrees in either direction there is provided a pair of cooperating stops 92 and 94 on the rotatable bracket 66 and the bearing 34, respectively. On the depression of the trigger, the plunger will be axially projected by the yoke 46 and through the cooperation of pins 74 and cam slots 76, the tongs will be pivoted open about pivots 82, the release of the trigger providing for the self-closing of the tongs by spring 40.

Rotatably mounted in the barrel part 14 about the axis thereof is a dial drum 96 bearing a series of scales S, there being eight such scales in the illustrated embodiment angularly spaced 45 degrees apart. The drum 96 has a reduced-diameter cylindrical part 98 and adjoining part 100 of approximately square cross-section, and a pair of end bearings project from the opposite ends of drum 96, only one such bearing 101 being shown. Mounted on part 98 is a rotary contact member 102 which is interlocked on part 98 by tabs 104 extending into slots 106 (see FIG. 6). Member 102 includes a pair of axially extending and radially resilient contacts 108 and 108', which are engageable with companion contacts 109 of the stationary contact discs 110 and 112, respectively. Discs 110 and 112 are insulating wafers. Member 102 has two connected contact areas A and B, the former area extending for 270 degrees and the latter area for 90 degrees.

Interfitted on the part 100 of the drum and thus keyed thereto is a rotary member 114 which rotates the drum for scale changing and indexing in response to actuation of the push button 24 which is operatively connected with member 114 (FIGS. 3-5). The member 114 has a series of eight radially projecting pins 116 spaced 45 degrees apart corresponding to the eight scales and positions of the drum. The push button 24 is manually depressible with respect to the barrel part and is spring returned to home position on release, and on each cycle of operation the drum rotates 45 degrees and is indexed at the next position. The push button 24 has a shoulder 118 which is biased into engagement against a companion abutment 120 of the casing by the flat spring arm 122, the latter having a depending flange 124 in engagement with the push button. A compression spring 126 is seated in a companion recess 128 of the casing and the spring arm 122 is connected to the spring by pin 130. Thus on push button depression the spring is compressed in recess 128 and on push button release the spring returns the push button to home position. The contact discs 110 and 112 are suitably notched or cutaway as indicated at 132 and 134, respectively to provide space for the arm 122 and push button, respectively.

The push button and companion member 114 are preferably of integrally molded construction and the push button is provided with a cam-shaped recess 136 at the underside thereof for the reception of pins 116. Recess 136 includes cam surfaces 138 at one side and cam surfaces 140 at the opposite side, the cam surfaces 138 coacting with companion pins 116 on depression of the push button to advance the pins and drum 22½ degrees and the cam surface 140 coact with the now advanced companion pins 116 on the spring return of the push button to further advance the pins and drum another 22½ degrees, so that on each cycle of push button operation the drum is advanced 45 degrees and indexed at the next position. In this manner the drum may be indexed sequentially from scale to scale to register a selected scale at the window 22. At each position of the drum a circuit corresponding to the registered scale is made through contacts 108 and 108' and their companion contacts of the discs 110 and 112, respectively. The meter circuits per se form no part of the present invention and accordingly such circuits will only be referred to briefly herein as a detailed description thereof is considered unnecessary to the understanding of the present invention.

Brushes 142 and 144 are T-shaped, the leg of each T extending in resilient contacting engagement with contact areas A and B, respectively of rotary contact member 102. The cross bar of the T extends into slots in the contact discs 110 and 112, for mechanical support. The eight different drum positions or stations are labelled 1 through 8 in clockwise order in FIG. 6 and the circuit diagram of FIG. 9. Brush 142 is in contacting engagement with area A for 270 degrees, this brush having its contact portion aligned with the #2 contact position for engagement with area A when brushes 108 and 108a engage any of the contacts 109 in positions #1–#6. Brush 144 is in engagement with area B for 90 degrees, having its contact portion aligned with the #7 contact position for engaging area B when brushes 108 and 108a engage contacts 109 in either of the positions #7 and #8. Disc 112 has 5 contacts and is devoid of contacts at stations 4–6 (see circuit diagram). In the illustrated embodiment, stations 1–4 are different current scales, stations 5 and 6 are different voltage scales, and stations 7 and 8 are different resistance scales, it being understood that the scales and associated circuits to be used may be arranged in any desired manner, the illustrated embodiment being given by way of example only.

The tongs are used only for current measurement and the conductor for current measurement acts as the primary of a transformer which induces a voltage in the secondary or output coil 60, the tongs acting as the core of the transformer. The induced voltage in coil 60 is impressed on a loading resistor 178 and on a network including shunting resistors, a rectifier R and a D'Arsonval-type direct-current milliammeter M. For the different alternating-current scales the shunt that is connected across the meter-rectifier circuit is changed. Resistors 150, 152 and 154 are the different shunts, no shunt being included at the #4 contact position.

For voltage measurement, the plug-in terminals 156 for usual terminal test leads are used, provided in the disclosed instrument at the base of the pistol grip. Multiplier resistors 158 and 160 are used for the two voltage ranges provided.

Resistance is measured by plug-in leads 156 and ohm meter circuits including shunts 162 and 164 for the two resistance scales and a battery 166 which is housed in the casing. Access to the battery is obtained through a detachable cover member 168. Battery 166 may also be connected through a switch (not shown) for energizing a lamp 170 mounted in the swivel head as indicated in FIG. 1, for illuminating the conductor to be encircled by the movable soft-iron tongs 18. A variable resistor 172 for compensating for changes in battery output is housed in the pistol grip and is manually adjusted by operating member 174, accessible at the face of the grip. Also accessible at the face of the grip is meter pointer adjustment 176 to zero the pointer on the scale. The circuit further includes a calibrating resistor 178 and a trimming resistor 180 primarily effective for the current range, and a meter shunting resistor 181 is also provided.

The trigger 20 which actuates the tongs is readily accessible for operation by the hand which holds the pistol grip. The push button 24 may be depressed by the thumb of the same hand, thereby making one hand operation possible. The swivel head provides for relative movement of the tongs and handle out of parallel planes so that the tongs may be accommodated to the test conductor without compelling the hand grip to assume an awkward position. In this way current readings may be obtained where the conductors are relatively inaccessible. Further, the current may often be read while the instrument is clamped about the current-carrying conductor, thus making it unnecessary to use the customary needle clamp of the movement which, though contemplated, is not shown.

Various additional modifications of the above embodiments of the invention will readily occur to those skilled in the art, and therefore the invention should be broadly construed in accordance with its full spirit and scope.

Having thus described our invention what we claim as new and desire to secure by Letters Patent is:

1. An alternating current measuring instrument, comprising a combined casing and hand-grip unit and a head unit, the head unit including an induction coil and a magnetic core structure through said coil, said magnetic core structure including a pair of tongs relatively movable between open and closed positions for encircling a test conductor, said casing and hand-grip unit containing an alternating current measuring circuit connected to said coil and responsive to the current flow in the test conductor, said measuring circuit including an electrical indicating meter, a swivel connection between said head unit and said combined casing and hand-grip unit, and manual operating means for said tongs including spring means normally biasing the tongs closed, a trigger movably mounted in said combined unit, and mechanical coupling means between said tongs and said trigger for providing an operating connection from said trigger to said tongs for opening the tongs against the bias of said spring means despite swivel movement of said head unit relative to said combined casing and hand-grip unit.

2. An alternating current measuring instrument, comprising a combined casing and hand-grip unit and a head unit, the head unit including an induction coil and a magnetic core structure through said coil, said magnetic core structure including a pair of pivotally mounted tongs relatively movable in a plane between open and closed positions for encircling a test conductor, said casing and hand-grip unit containing an alternating current measuring circuit connected to said coil and responsive to the current flow in the test conductor, said measuring circuit including an electrical indicating meter, and a pivotal mounting connecting said head unit and said casing and hand-grip unit, the pivotal axis of said mounting being between the tongs and parallel to the plane of movement of said tongs, and operating means for said tongs including a trigger in said combined unit and coupling means between said tongs and said trigger for maintaining mechanical coordination therebetween despite relative movement of said head unit and said combined casing and hand-grip unit.

3. An alternating current measuring instrument, comprising a combined casing and hand-grip unit and a head unit, the head unit including an induction coil and a magnetic core structure through said coil, said magnetic core structure including a pair of pivotally mounted tongs relatively movable in a plane between open and closed positions for encircling a test conductor, said casing and hand-grip unit containing an alternating current measuring circuit connected to said coil and responsive to the current flow in the test conductor, said measuring circuit including an electrical indicating meter, a pivotal mounting connecting said head unit and said casing and hand-grip unit, a trigger movably mounted on said casing and hand-grip unit, spring means normally biasing said tongs closed, and an axially reciprocable plunger providing an operative connection from said trigger to said tongs for opening the tongs.

4. An electrical current measuring instrument, comprising interconnected casing and head units, the former unit being of pistol-shaped configuration including an elongated barrel part and a pistol-grip extending laterally from said barrel part and having a manually operable trigger extending along and disposed laterally of said pistol-grip, said head unit comprising a magnetic-core structure including a pair of tongs relatively movable between opened and closed position for encircling a test conductor to measure current flow therein, said head unit and the tongs thereof projecting endwise from said elongated barrel part, and an induction coil mounted between said tongs about said core structure, said barrel part containing a meter movement in circuit with said coil and responsive to the current flow in the test conductor, and an elongated scale companion to said movement disposed along said elongated barrel part, said scale facing away from a mean plane through said head unit and said barrel part and said pistol-grip, said instrument including a swivel connection between said head unit and said barrel part providing for rotation of said head unit and said tongs thereon about the longitudinal axis of said elongated barrel part, spring means normally biasing said tongs into coaction with each other so as to be closed normally, and an axial plunger extending through said swivel connection and providing mechanical coupling between said trigger and said pair of relatively movable tongs for actuating same to said open position.

References Cited in the file of this patent

UNITED STATES PATENTS

| | | |
|---|---|---|
| 1,610,304 | Mabie | Dec. 14, 1926 |
| 2,202,939 | Zipser | June 4, 1940 |
| 2,663,845 | Koch | Dec. 22, 1953 |
| 2,783,437 | Yenni | Feb. 26, 1957 |

OTHER REFERENCES

Publication, Metrix Instruments, Transclip 400, by M. E. Gerry & Co., 230 Bayard Road, Upper Darby, Pa., March 28, 1955 (4 pages, only first page relied on).